United States Patent
Hayashi (10) Patent No.: US 6,304,538 B1
(45) Date of Patent: *Oct. 16, 2001

(54) INFORMATION REPRODUCING APPARATUS FOR REPRODUCING DIGITAL INFORMATION ON RECORD MEDIUM

(75) Inventor: Hideki Hayashi, Tsurugashima (JP)

(73) Assignee: Pioneer Electronic Corporation, Tokyo-To (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/145,282

(22) Filed: Sep. 2, 1998

(30) Foreign Application Priority Data

Sep. 5, 1997 (JP) .................................................. 9-241497

(51) Int. Cl.⁷ ...................................................... G11B 7/00
(52) U.S. Cl. .................................... 369/59.22; 369/53.33; 369/124.05
(58) Field of Search ................................. 369/59, 124.05, 369/59.22, 55.33; 386/21, 113, 126; 375/355; 360/65

(56) References Cited

U.S. PATENT DOCUMENTS

| | | | |
|---|---|---|---|
| 5,517,476 | * 5/1996 | Hayashi | 369/124.05 X |
| 5,657,812 | * 8/1997 | Hayashi | 369/275.3 |
| 5,835,467 | * 11/1998 | Tomita et al. | 369/124.05 X |
| 5,901,128 | * 5/1999 | Hayashi et al. | 369/124.05 X |
| 5,963,518 | * 10/1999 | Kobayashi et al. | 369/48 |
| 6,009,067 | * 12/1999 | Hayashi | 369/124.05 OR |

* cited by examiner

Primary Examiner—Aristotelis M. Psitos (57) ABSTRACT

An information reproducing apparatus for reproducing digital record information recorded on an information record medium is provided with: a generating device for reading out the digital record information from the information record medium to thereby output a reproduction signal; a sampling device for sampling the reproduction signal by using a sampling clock signal having a predetermined sampling frequency to thereby output the sampled reproduction signal; a detection device for detecting a direct current level of the sampled reproduction signal by extracting a zero-cross sample value, which is a sample value contained in the sampled reproduction signal and is the closest sample value to a zero level in the sampled reproduction signal, from the sampled reproduction signal; a correcting device for correcting the sampled reproduction signal by subtracting the detected direct current level from each sample value of the sampled reproduction signal to thereby output the corrected sampled reproduction signal; and a reproducing device for decoding the corrected sampled reproduction signal to thereby reproduce the digital record information.

8 Claims, 7 Drawing Sheets

FIG. 4 fc : CUT-OFF FREQUENCY WHEN fs=5MHz
fc' : CUT-OFF FREQUENCY WHEN fs=50MHz

INFORMATION REPRODUCING APPARATUS FOR REPRODUCING DIGITAL INFORMATION ON RECORD MEDIUM

BACKGROUND OF THE INVENTION

1. Field of the Invention

The present invention relates to an information reproducing apparatus for reproducing digital record information recorded on a CD (Compact Disc), a DVD (which is an optical disc having a record capacity equal to approximately seven times that of the CD) or the like.

2. Description of the Related Art

The CD or DVD is popularized which is an optical disc on which an audio signal, a video signal or the like is recorded as a digital record information. Moreover, a so-called CD-ROM (CD-Read Only Memory) or a DVD-ROM (DVD-Read Only Memory) is also popularized which is the CD or DVD as an external memory of a computer.

A reproducing apparatus for these optical discs receives a reflection light of a light beam irradiated onto the optical disc to obtain an analog reproduction signal corresponding to the digital record information, then corrects a high band attenuation property of the analog reproduction signal by an equalizer, then inputs it to an analog high pass filter to remove a direct current component contained in the analog reproduction signal, then converts it into a binary value and finally reproduces the digital record information.

Figure 6:
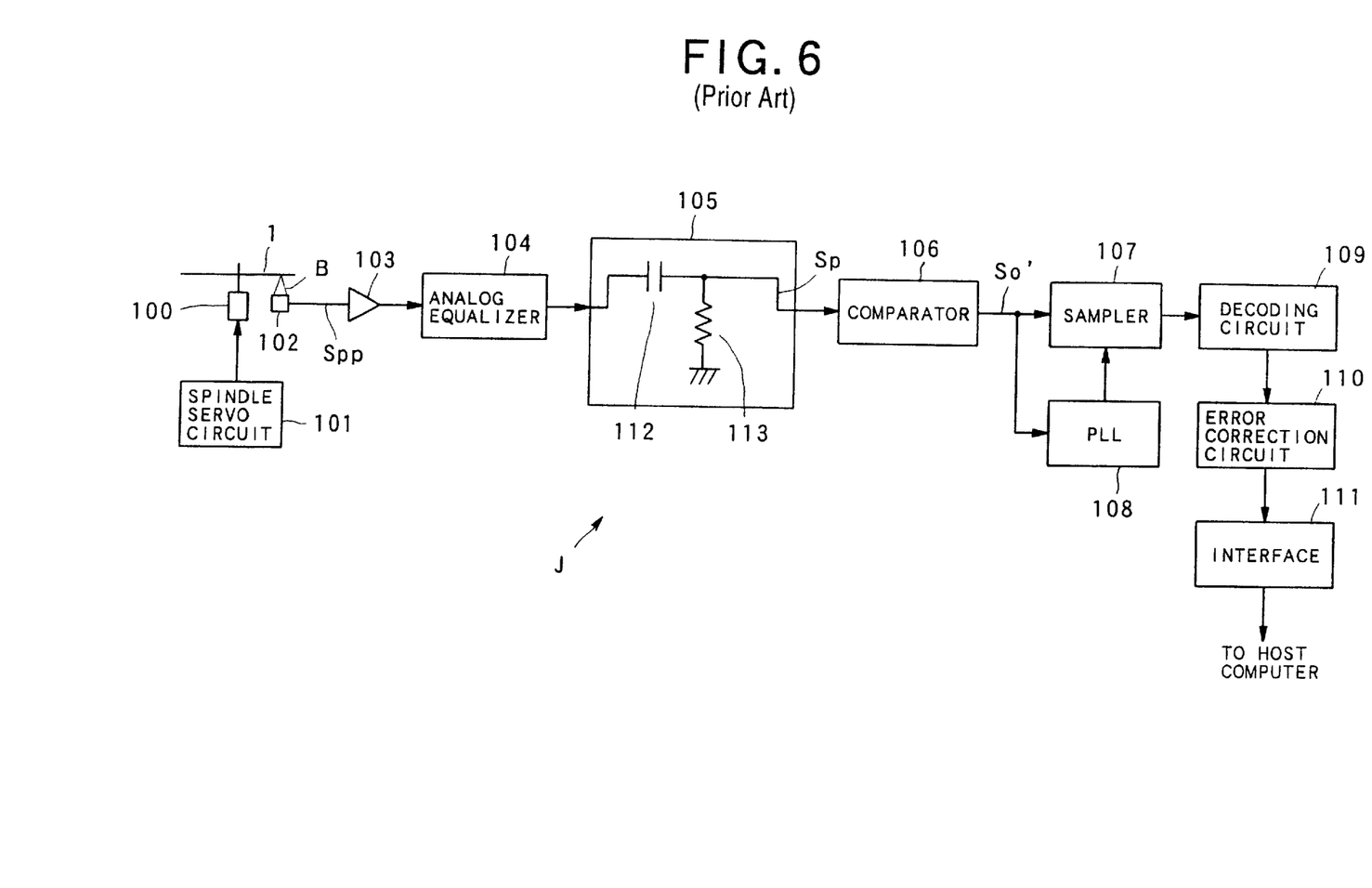
FIG. 6 is a block diagram showing a schematic configuration of an information reproducing apparatus in the related art.

Now, the inventor knows such a DVD-ROM reproducing apparatus as is schematically shown in FIG. 6.

As shown in FIG. 6, an information reproducing apparatus J is provided with a spindle motor 100, a spindle servo circuit 101, an optical pickup 102, an amplifier 103, an analog equalizer 104, an analog high pass filter 105, a comparator 106, a sampler 107, a PLL (Phase Locked Loop) 108, a decoding circuit 109, an error correction circuit 110 and an interface 111.

The analog high pass filter 105 is composed of a capacitor 112 and a resistor 113.

Next, a schematic operation will be explained below.

The spindle motor 100 rotates a DVD I at a predetermined rotation number under the control of the spindle servo circuit 101.

Then, the optical pickup 102 irradiates a light beam B onto the rotating DVD 1, converts the reflection light thereof into an electric signal so as to generates a reproduction signal Spp corresponding to the digital record information recorded on the DVD 1, and then outputs it to the amplifier 103.

Next, the amplifier 103 amplifies the inputted reproduction signal Spp at a predetermined amplification factor, and then outputs it to the analog equalizer 104.

The analog equalizer 104 emphasizes a high frequency band portion of the reproduction signal Spp, which originally has a high frequency band attenuation property, so as to correct a frequency property thereof.

The reproduction signal Spp in which the frequency property is corrected contains a low frequency noise component resulting from a variation in the reflectance and a variation in the refraction factor of the DVD 1, a trace error of a servo mechanism for the light beam B and the like. Therefore, the reproduction signal Spp in which the frequency performance is corrected is inputted to the analog high pass filter 105. The low frequency noise component containing a direct current component is removed by the analog high pass filter 105, so that the reproduction signal Spp is outputted as an analog reproduction signal Sp. In this analog reproduction signal Sp, a central level thereof coincides with a predetermined reference voltage.

Next, the comparator 106 compares a voltage of the analog reproduction signal Sp with the predetermined reference voltage (for example, a zero potential level), and then outputs a pulse signal (a pulse signal corresponding to the record information recorded on the DVD 1) So' of "1" or "0".

Accordingly, the PLL 108 generates a clock signal in which the phase is synchronous with the pulse signal So'.

The sampler 107 samples the pulse signal So' from the comparator 106 on the basis of the clock signal from the PLL 108, and then outputs digital data corresponding to the digital record information.

After that, the digital data is decoded by the decoding circuit 109 in accordance with a predetermined decoding method (for example, an 8/16 decoding method when the record information on the DVD 1 is reproduced). The error correction is performed by the error correction circuit 110. After that, the digital data is outputted through the interface 111 to an external equipment, for example, a host computer and the like.

Incidentally, assuming that a capacitance of the capacitor 112 is C and that a resistance of the resistor 113 is R, a cut-off frequency fc of the analog high pass filter 105 is expressed as following.

$$fc = 1/2\pi CR$$

Incidentally, in the field of the CD-ROM or the DVD-ROM, a multiple speed reproduction (e.g., a double speed reproduction, a triple speed reproduction and soon) for rotating it at a rotation speed of integer times of that for a normal music reproduction and reading out the recorded digital record information, and a variable speed reproduction for changing a reproduction speed depending on a position on a disc of the CD-ROM or the DVD-ROM are performed.

Now, the case of the DVD is considered as an example. If the digital record information recorded on the DVD is reproduced, the frequency band thereof (i.e., a frequency band of the reproduction signal Spp) is generally distributed in a frequency band from several hundreds of hertzes (Hz) to several mega-hertzes (MHz). In contrast with this, a frequency band of a noise unnecessary for the reproduction, such as external disturbance and the like, is distributed in a frequency band from a direct current to approximately tens of kilo-hertzes (kHz).

Thus, the noise resulting from the external disturbance and the digital record information to be originally reproduced exist together in the frequency band from hundreds of hertzes to tens of kilo-hertzes. When the conventional analog high pass filter is used, if the cut-off frequency is set high so as to perfectly remove the noise, the low frequency component of the digital record information is also removed. On the other hand, if the cut-off frequency is set low so as to perfectly pass the digital record information, the noise is also passed. After all, there is a problem that it is difficult to perform both of the removal of the noise and the pass of the digital record information.

Figure 7:
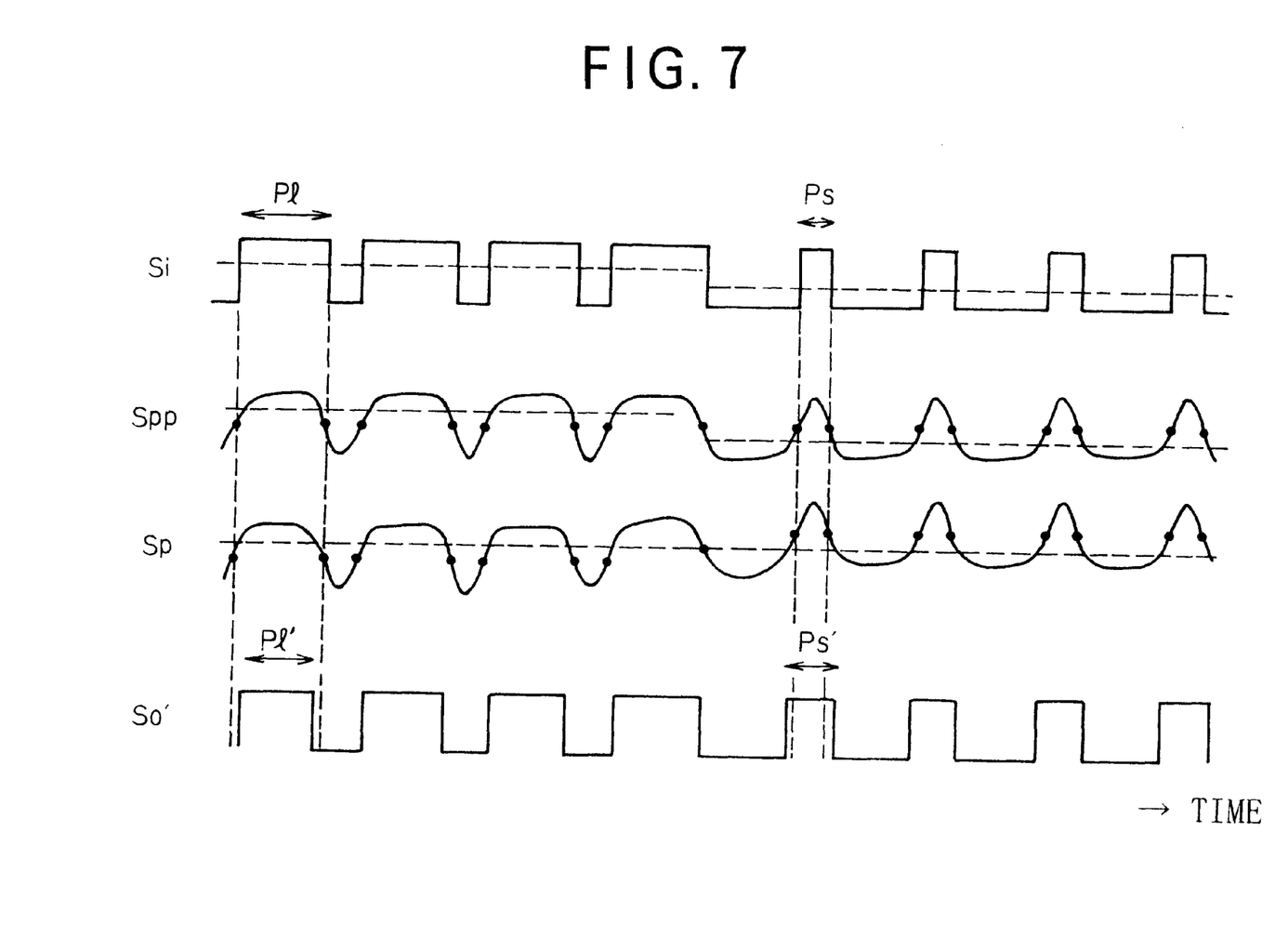
FIG. 7 is a timing chart showing an operation of an analog high pass filter in the apparatus of FIG. 6.

Moreover, the digital record information is recorded on the DVD by a combination of pits having a plurality of lengths. At this time, for example, as shown in FIG. 7, if in a record sign Si as the digital record information, high levels each having a long length Pl are consecutive and then high levels each having a short length Ps are consecutive, the waveform of the record sign Si is as shown at a top stage of FIG. 7. Now, the dashed line at the top stage of FIG. 7 indicates the average of the values of the record sign Si. The average in the former half (i.e., a period in which the high levels each having the long length Pl are consecutive) is relatively high, and the average in the latter half (i.e., a period in which the high levels each having the short length Ps are consecutive) is relatively low. This variation of the average corresponds to the low frequency component of the digital record information. Incidentally, after the long pits are consecutive, the short pits are consecutive on the record surface of the DVD in this case.

Then, the reproduction signal Spp obtained in response to the record sign Si has the wave shown at a second stage of FIG. 7 by detecting the pits on the record surface of the DVD. Now, the dashed line at the second stage FIG. 7 indicate the average of the values of the reproduction signal Spp. In response to the above explained record sign Si, the average in the former half is relatively high, and the average in the latter half is relatively low. Moreover, black points on this average curve indicate the zero-cross points at which the reproduction signal Spp and a zero potential level intersect each other.

Then, the analog reproduction signal Sp generated by passing the reproduction signal Spp through the analog high pass filter 105 has the waveform shown at a third stage from the top of FIG. 7. Now, the dashed line indicates an average of the values of the analog reproduction signal Sp, similarly to the case of the reproduction signal Spp. Black points on this average curve indicate points corresponding to the zero-cross points of the reproduction signal Spp in the analog reproduction signal Sp.

As can be seen from these waveforms, since the analog high pass filter 105 removes the low frequency component from the reproduction signal Spp, the average of the analog reproduction signal Sp has the same constant zero potential level in both of the former half and the latter half. The zero-cross points (the black points) in the reproduction signal Spp corresponds to the negative level lower than the zero potential level of the analog reproduction signal Sp in the former half, and corresponds to the positive level higher than the zero potential level of the analog reproduction signal Sp in the latter half. That is, the location situated at the zero-cross point in the stage of the reproduction signal Spp is shifted to the positive side or the negative side in the analog reproduction signal Sp.

Thus, a pulse signal So' having a waveform shown at a bottom stage of FIG. 7 is generated by detecting by the comparator 106 whether this analog reproduction signal Sp is higher or lower than the zero potential level, that is, just positive or negative and then reproducing it. However, a length Pl' or Ps' of a high level period in this pulse signal So' has a length different from that of the length Pl or Ps of the high level period in the record sign Si as indicated by FIG. 7.

In other words, this implies a problem that information different from the digital record information to be reproduced is in fact reproduced because the analog high pass filter removes the low frequency component from the digital record information.

Moreover, while the frequency band of the analog reproduction signal to be reproduced is also changed in the above mentioned multiple speed reproduction or variable speed reproduction, the cut-off frequency is constant in the conventional analog high pass filter. Hence, this results in a problem that the noise component cannot be effectively removed in response to the variation of the frequency band.

SUMMARY OF THE INVENTION

The present invention is proposed in view of the above mentioned problems. It is therefore an object of the present invention to provide an information reproducing apparatus, which can perform both of the effective removal of the noise component and the reproduction over the wide frequency band of the record information, and also effectively remove the noise in response to the variation of the reproduction speed.

The above object of the present invention can be achieved by a first information reproducing apparatus for reproducing digital record information recorded on an information record medium The first information reproducing apparatus is provided with: a generating device for reading out the digital record information from the information record medium to thereby output a reproduction signal; a sampling device for sampling the reproduction signal by using a sampling clock signal having a predetermined sampling frequency to thereby output the sampled reproduction signal; a detection device for detecting a direct current level of the sampled reproduction signal by extracting a zero-cross sample value, which is a sample value contained in the sampled reproduction signal and is the closest sample value to a zero level in the sampled reproduction signal, from the sampled reproduction signal; a correcting device for correcting the sampled reproduction signal by subtracting the detected direct current level from each sample value of the sampled reproduction signal to thereby output the corrected sampled reproduction signal; and a reproducing device for decoding the corrected sampled reproduction signal to thereby reproduce the digital record information.

According to the first information reproducing apparatus of the present invention, the digital record information is read out from the information record medium such as a DVD or the like by the generating device such as an optical pickup or the like, so that the reproduction signal is outputted therefrom Then, the reproduction signal is sampled by using the sampling clock signal by the sampling device such as an A/D (Analog to Digital) converter or the like, so that the sampled reproduction signal is outputted therefrom. Then, the direct current level of the sampled reproduction signal is detected by extracting the zero-cross sample value from the sampled reproduction signal by the detection device such as a zero-cross detection circuit in a digital high pass filter or the like. Here, the zero-cross sample value is a sample value contained in the sampled reproduction signal and is the closest sample value to a zero level in the sampled reproduction signal. Then, the sampled reproduction signal is corrected by subtracting the detected direct current level from each sample value of the sampled reproduction signal by the correcting device such as a subtraction circuit in a digital high pass filter or the like, so that the corrected sampled reproduction signal is outputted therefrom. Finally, the corrected sampled reproduction signal is decoded and the digital record information is reproduced by the reproducing device such as a VITERBI decoding circuit or the like.

Accordingly, since the sampled reproduction signal is corrected by subtracting the direct current level of the sampled reproduction signal from each sample value of the sampled reproduction signal, even if the low frequency band component in the reproduction signal is reduced, the low frequency band component can be restored. Therefore, it is possible to reproduce the digital record information accurately with a high fidelity by maintaining the signal component in the low frequency band.

The above object of the present invention can be also achieved by a second information reproducing apparatus for reproducing digital record information recorded on an information record medium. The second information reproducing apparatus is provided with: a generating device for reading out the digital record information from the information record medium to thereby output a reproduction signal; a sampling device for sampling the reproduction signal by using a sampling clock signal having a predetermined sampling frequency to thereby output the sampled reproduction signal; a correcting device for correcting the sampled reproduction signal so as to make a zero-cross sample value, which is a sample value contained in the corrected sampled reproduction signal and is the closest sample value to a zero level in the corrected sampled reproduction signal, coincident with the zero level to thereby output the corrected sampled reproduction signal; and a reproducing device for decoding the corrected sampled reproduction signal to thereby reproduce the digital record information.

According to the second information reproducing apparatus of the present invention, the digital record information is read out from the information record medium such as a DVD or the like by the generating device such as an optical pickup or the like, so that the reproduction signal is outputted therefrom Then, the reproduction signal is sampled by using the sampling clock signal by the sampling device such as an A/D (Analog to Digital) converter or the like, so that the sampled reproduction signal is outputted therefrom Then, the sampled reproduction signal is corrected so as to make the zero-cross sample value coincident with the zero level by the correcting device such as a digital high pass filter or the like, so that the corrected sampled reproduction signal is outputted therefrom. Here, the zero-cross sample value is a sample value contained in the corrected sampled reproduction signal and is the closest sample value to the zero level in the corrected sampled reproduction signal. Finally, the corrected sampled reproduction signal is decoded and the digital record information is reproduced by the reproducing device such as a VITERBI decoding circuit or the like.

Accordingly, since the sampled reproduction signal is corrected by making the zero-cross sample value of the corrected sampled reproduction signal coincident with the zero level, even if the low frequency band component in the reproduction signal is reduced, the low frequency band component can be restored. Therefore, it is possible to reproduce the digital record information accurately with a high fidelity by maintaining the signal component in the low frequency band.

In one aspect of the second information reproducing apparatus, the correcting device is provided with: an extracting device for extracting a smaller absolute value of two consecutive sample values when polarities of the two consecutive sample values contained in the corrected sampled reproduction signal are different from each other, as the zero-cross sample value; an averaging device for averaging the extracted zero-cross sample value over a plurality of cycles of the sampled reproduction signal to thereby output an average thereof; and a subtracting device for subtracting the outputted average from each sample value of the sampled reproduction signal to thereby output the corrected sampled reproduction signal.

According to this aspect, when the polarities of the two consecutive sample values contained in the corrected sampled reproduction signal are different from each other, i.e., when the polarity of the sample value is changed at a certain time point, the smaller absolute value of two consecutive sample values is extracted as the zero-cross sample value by the extracting device such as a zero-cross detection circuit or the like. Then, the extracted zero-cross sample value is averaged over the plurality of cycles of the sampled reproduction signal by the averaging device such as an averaging circuit or the like, so that the average is outputted therefrom. Then, the outputted average is subtracted from each sample value of the sampled reproduction signal by the subtracting device such as a subtraction circuit or the like, so that the corrected sampled reproduction signal is outputted therefrom.

Accordingly, since the sampled reproduction signal is corrected by constructing a closed loop, an accurate corrected sampled reproduction signal can be generated, so that it is possible to accurately reproduce the digital record information.

In this aspect, the correcting device may be further provided with a selecting device for selecting either one of (i) each sample value in the corrected sampled reproduction signal and (ii) the zero-cross sample value over the plurality of cycles, and the averaging device averages the selected sample value to thereby output the average.

According to the construction in this case, either one of (i) each sample value in the corrected sampled reproduction signal and (ii) the zero-cross sample value over the plurality of cycles is selected by the selecting device such as a selection circuit or the like. Then, the selected sample value is averaged by the averaging device, so that the average is outputted therefrom. Accordingly, it is possible to prevent an inaccurate correcting process from being executed by the correcting device.

Further, in this case, the selecting device may select (i) the each sample value when the sampling clock signal and the reproduction signal are not synchronous with each other and may select (ii) the zero-cross sample when the sampling clock signal and the reproduction signal are synchronous with each other.

According to the construction in this case, when the sampling clock signal and the reproduction signal are not synchronous with each other, (i) the each sample value is selected by the selecting device. When the sampling clock signal and the reproduction signal are synchronous with each other, (ii) the zero-cross sample is selected by the selecting device. Accordingly, it is possible to prevent an erroneous operation from being executed when the sampling clock signal and the reproduction signal are not synchronous with each other, and it is further possible to resume an accurate correcting process immediately after the recovery of the synchronization.

In one aspect of the first information reproducing apparatus or in another aspect of the second information reproducing apparatus of the present invention, the correcting device reduces a low frequency component lower than a predetermined digital cut-off frequency in the sampled reproduction signal, and the digital cut-off frequency is changed in response to the predetermined sampling frequency.

According to this aspect, the low frequency component lower than the predetermined digital cut-off frequency in the sampled reproduction signal is reduced by the correcting device. And that, when the predetermined sampling frequency is changed, this digital cut-off frequency is changed in response to the predetermined sampling frequency.

Accordingly, since the correcting device functions as a digital high pass filter, it is possible to reduce the frequency component lower than the digital cut-off frequency in the noise due to the external disturbance or the like. Further, even if the frequency of the reproduction signal is changed, the reduction of the low frequency component in the noise by means of the correcting device can be efficiently performed.

In this aspect of the first or second information reproducing apparatus, the predetermined sampling frequency may be changed to be one of sampling frequencies used for a multiple speed reproduction. Accordingly, when the sampling frequency is changed in line with a double speed reproduction, a triple speed reproduction or the like in the multiple speed reproduction, the predetermined sampling frequency is changed correspondingly, so that the reduction of the low frequency component in the noise by means of the correcting device can be still efficiently performed for each speed in the multiple speed reproduction.

Alternatively, in this aspect of the first or second information reproducing apparatus, the predetermined sampling frequency may be changed to be one of sampling frequencies used for a variable speed reproduction. Accordingly, when the sampling frequency is changed in association with a position on the information record medium at which the digital record information is being reproduced, in the variable speed reproduction, the predetermined sampling frequency is changed correspondingly, so that the reduction of the low frequency component in the noise by means of the correcting device can be still efficiently performed for each speed in the variable speed reproduction.

In another aspect of the first or second information reproducing apparatus of the present invention, the sampling device comprises an A/D (Analog to Digital) converter, and the apparatus further comprises an analog filter disposed between the generating device and the A/D converter for reducing a frequency component of the reproduction signal lower than a predetermined analog cut-off frequency.

According to this aspect, the frequency component of the reproduction signal lower than the predetermined analog cut-off frequency is reduced by the analog filter at the stage prior to the A/D converter. Accordingly, the low frequency component of the noise can be reduced before the reproduction signal is sampled by the A/D converter, so that it is possible to perform the even more accurate reproduction of the digital record information.

In another aspect of the first or second information reproducing apparatus of the present invention, the reproducing device is a reproducing device using a VITERBI decoding method.

According to this aspect, since the corrected sampled reproduction signal is decoded and the digital record information is reproduced by the VITERBI decoding method, even in a case that the S/N ratio of the corrected sampled reproduction signal is relatively low and the like, it is still possible to perform the decoding and reproducing process accurately.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Preferred embodiments of the present invention will be explained below with reference to the drawings. Incidentally, embodiments described below are embodiments in which the present invention is applied to an information reproducing apparatus which reproduces digital record information recorded on an information record surface of a DVD as an information record medium by using pits.

(I) First Embodiment

At first, a first embodiment of the present invention is explained with reference to FIGS. 1 to 4.

Figure 1:
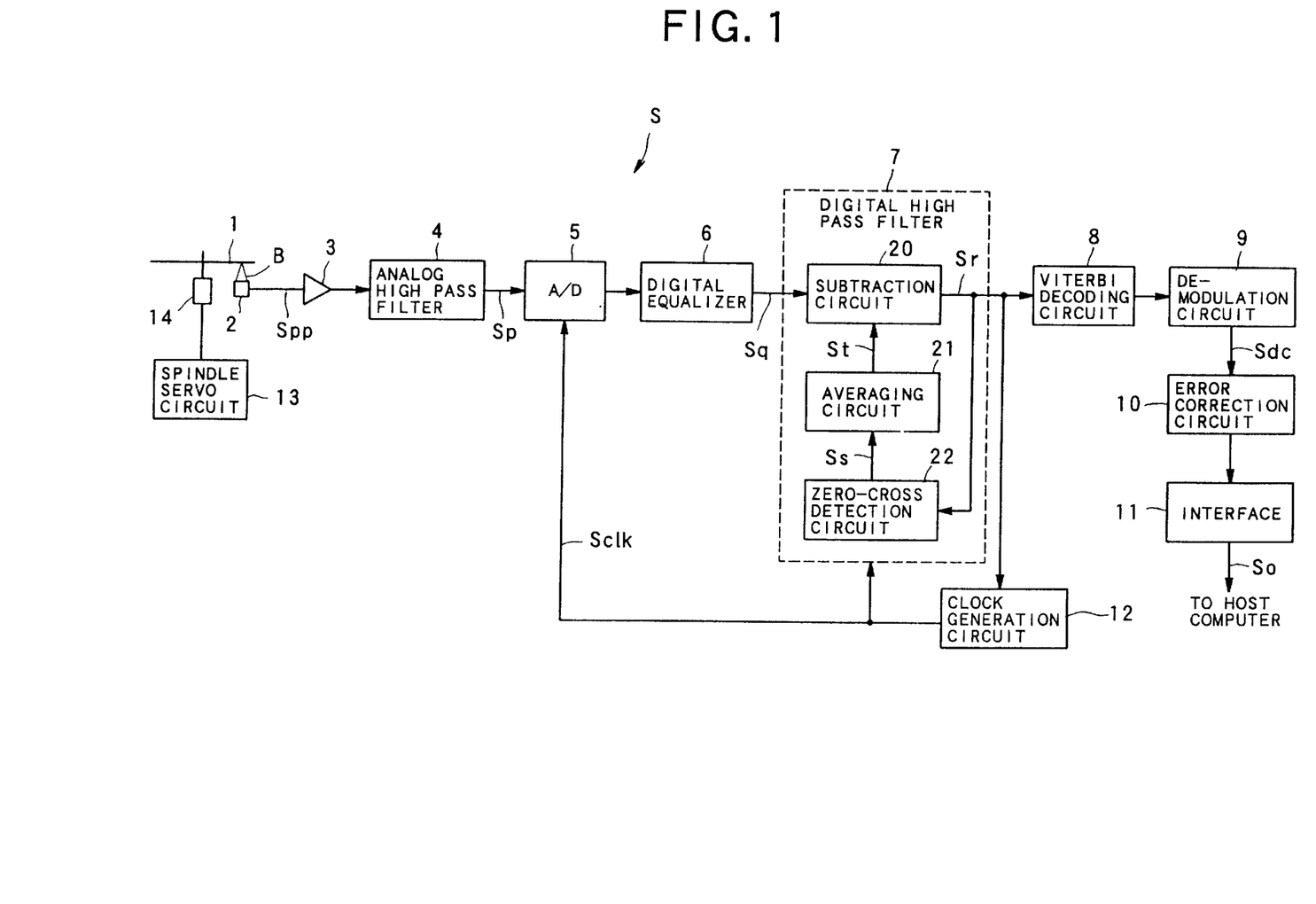
FIG. 1 is a block diagram showing a schematic configuration of an information reproducing apparatus as a first embodiment.

As shown in FIG. 1, an information reproducing apparatus S as the first embodiment is provided with an optical pickup 2 servicing as one example of a generating device, an amplifier 3, an analog high pass filter 4, an A/D (Analog to Digital) converter 5 serving as one example of a sampling device, a digital equalizer 6, a digital high pass filter 7 servicing as one example of a correcting device, a VITERBI decoding circuit 8 and a decoding circuit 9 serving as one example of a reproducing device, an error correction circuit 10, an interface 11, a clock generation circuit 12, a spindle servo circuit 13 and a spindle motor 14.

The digital high pass filter 7 is provided with a subtraction circuit 20 servicing as one example of a subtracting device, an averaging circuit 21 servicing as one example of an averaging device and a zero-cross detection circuit 22 servicing as one example of an extracting device. At this time, the subtraction circuit 20, the averaging circuit 21 and the zero-cross detection circuit 22 constitute one closed loop.

Next, the whole operation will be explained below.

A DVD 1 on which the digital record information to be reproduced is recorded is rotation-driven by the spindle motor 14 driven by the spindle servo circuit 13 controlled by a CPU (not shown). At this time, if the DVD 1 is reproduced at a multiple speed or a variable speed, the DVD 1 is rotation-driven at a rotation number suitable for the respective reproduction method.

On one hand, the optical pickup 2 irradiates a light beam B, which is a laser light, onto an information record surface of the DVD 1 which is being rotation-driven, and then outputs a reproduction signal Spp (as for an example of a concrete actual waveform thereof, refer to FIG. 7) having a waveform corresponding to the digital record information recorded on the DVD 1 based on the reflection light of the light beam B. At this time, the frequency band of the reproduction signal Spp is distributed in the frequency band from several hundreds of hertzes (Hz) to several megahertzes (MHz), as aforementioned.

When the optical pickup 2 irradiates the light beam B onto the DVD 1, a servo control circuit (not shown) applies a tracking servo control and a focus servo control to the light beam B. Accordingly, the light beam B exactly tracks the tracks on the DVD 1 and is exactly collected on the information record surface.

The reproduction signal Spp outputted from the optical pickup 2 is amplified by the amplifier 3 at a predetermined amplification factor, and is outputted to the analog high pass filter 4. The analog high pass filter 4 reduces a low frequency noise contained in the reproduction signal Spp, and outputs it as an analog reproduction signal Sp (as for an example of a concrete waveform, refer to FIG. 7). At this time, the cut-off frequency in the analog high pass filter 4 is set to, for example, 1 kilo-hertz so as not to reduce as much as possible the low frequency component of the digital record information contained in the reproduction signal Spp.

Next, the analog reproduction signal Sp is sampled by the A/D converter 5 on the basis of a clock signal Sclk having a sampling frequency described later. A level correction to amplify a high frequency component is applied to the sampled signal by the digital equalizer 6. Then, it is outputted to the digital high pass filter 7 as a digital reproduction signal Sq. At this time, the reason why the level correction is applied by the digital equalizer 6 is that the reproduction signal Spp itself has such a characteristic that the high frequency component thereof is originally attenuated.

For the digital reproduction signal Sq inputted to the digital high pass filter 7, the above mentioned low frequency component (i.e., the low frequency component of the reproduction signal Spp attenuated by the analog high pass filter 4) is restored by the digital high pass filter 7 by using the clock signal Sclk described later. Further, the low frequency component of the noise, such as the external disturbance and the like, is removed by the digital high pass filter 7. Then, it is outputted as a corrected digital reproduction signal Sr. At this time, the cut-off frequency in the digital high pass filter 7 is set to, for example, 10 kilo-hertzes so as to sufficiently remove the low frequency component of the noise. Now, the digital record information having a frequency component whose frequency is higher than the cut-off frequency of the analog high pass filter 4 and lower than the cut-off frequency of the digital high pass filter 7 is outputted as the corrected digital reproduction signal Sr without being reduced by an later-described operation of the digital high pass filter 7.

Then, the corrected digital reproduction signal Sr outputted from the digital high pass filter 7 is decoded by the VITERBI decoding circuit 8 by using a VITERBI decoding method, is further decoded by the decoding circuit 9, and is then outputted as a decoded signal Sdc.

After that, the error correction process is applied to the decoded signal Sdc by the error correction circuit 10, and is outputted through the interface 11 to an external host computer (not shown) as an output signal So corresponding to the digital record information.

On the other hand, the corrected digital reproduction signal Sr is also outputted to the clock generation circuit 12. Then, the clock generation circuit 12 generates the clock signal Sclk, which is to be outputted to the A/D converter 5 and the digital high pass filter 7, on the basis of a frequency and a phase of the reproduction signal detected from the corrected digital reproduction signal Sr. At this time, when the DVD 1 is reproduced at the multiple speed or the variable speed, the clock signal Sclk is outputted which has the sampling frequency corresponding to each of the reproduction speed. More actually, for example, when the DVD 1 is reproduced at a standard reproduction speed, the clock signal Sclk of 27 mega-hertzes is generated, and when the DVD 1 is reproduced at a double speed, the clock signal Sclk of 54 mega-hertzes is reproduced.

Here, the configuration of the clock generation circuit 12 is more actually explained. For example, a phase error between the analog reproduction signal Sp and the clock signal Sclk is detected from the corrected digital reproduction signal Sr, and this phase error is D/A-converted. Then, an oscillation frequency of a VCO (Voltage Controlled Oscillator) is controlled on the basis of a control voltage obtained by averaging this D/A-converted phase error through a low pass filter. Accordingly, the clock signal Sclk in synchronization with the analog reproduction signal Sp can be generated.

Next, the detailed configuration and the operation of the digital high pass filter 7 according to the present invention will be explained below with reference to FIG. 2 to FIG. 4.

As mentioned above, the digital high pass filter 7 is provided with the subtraction circuit 20, the averaging circuit 21 and the zero-cross detection circuit 22. Among them, the subtraction circuit 20 is constituted by a single subtraction circuit, as shown in FIG. 2.

The averaging circuit 21 is constituted by a D type flip-flop 40, an adder 41 and a multiplier 42.

Moreover, the zero-cross detection circuit 22 is constituted by a D type flip-flops 30 and 36, absolute value detecting circuits 31 and 32, a polarity inversion detecting circuit 33, a comparison circuit 34 and a selection circuit 35.

Next, the detailed configuration will be explained below with reference to FIG. 2.

When the digital reproduction signal Sq, which is generated by sampling the analog reproduction signal Sp on the basis of the clock signal Sclk, is inputted to the digital high pass filter 7, the subtraction circuit 20 subtracts an averaged signal St servicing as an output signal of the averaging circuit 21, from each sample value in the digital reproduction signal Sq. Then, the corrected digital reproduction signal Sr is outputted.

Then, the corrected digital reproduction signal Sr is outputted to the VITERBI decoding circuit 8, and is also outputted to the zero-cross detection circuit 22. When the polarities of two sample values adjacent to each other in the corrected digital reproduction signal Sr are changed to be different from each other, this zero-cross detection circuit 22 has a function of outputting the sample value whose absolute value is smaller in the two sample values, as a zero-cross sample value signal Ss.

That is, the corrected digital reproduction signal Sr inputted to the zero-cross detection circuit 22 is sent to the absolute value detecting circuit 31 and the selection circuit 35, and is also sent to the D type flip-flop 30 to which the clock signal Sclk is inputted as a timing signal. Moreover, it is delayed by a time duration corresponding to one clock of the clock signal Selk and is then outputted to the absolute value detecting circuit 32 and the selection circuit 35 as the delayed corrected digital reproduction signal Sr'.

Accordingly, the absolute value detecting circuit 31 detects the absolute value of one sample value in the corrected digital reproduction signal Sr before the delay, and then outputs an absolute value signal Sa to the comparison circuit 34.

On the other hand, the absolute value detecting circuit 32 detects an absolute value of another sample value, which is one before the above mentioned sample value, in the delayed corrected digital reproduction signal Sr', and then outputs the absolute value signal Sa' to the comparison circuit 34.

Accordingly, the comparison circuit 34 compares absolute values of two sample values adjacent to each other in the corrected digital reproduction signal Sr inputted as the absolute value signal Sa and the absolute value signal Sa', and outputs to the selection circuit 35 a comparison signal Sc indicating the smaller sample value thereof. Then, the selection circuit 35 selects two sample values adjacent to each other in the corrected digital reproduction signal Sr inputted separately as the corrected digital reproduction signal Sr and the delayed corrected digital reproduction signal Sr', on the basis of the inputted comparison signal Sc. Then, the selection circuit 35 outputs the sample value having the smaller absolute value as a minimum sample value signal Se to the D type flip-flop 36.

On the other hand, an MSB signal Smsb indicative of the MSB (Most Significant Bit) of the corrected digital reproduction signal Sr and an MSB signal Smsb' indicative of the MSB of the delayed corrected digital reproduction signal Sr' are inputted to an exclusive OR circuit servicing as one example of the polarity inversion detecting circuit 33. The MSB of the corrected digital reproduction signal Sr and the MSB of the delay corrected digital reproduction signal Sr' indicates the polarities in the reproduction signal, respectively. As a result, as an exclusive OR signal Sex which is an output signal from the polarity inversion detecting circuit 33, only when the MSB signal Smsb and the MSB signal Smsb' are different from each other, i.e., only when the polarities of the two sample values adjacent to each other in the corrected digital reproduction signal Sr are different from each other, the exclusive OR signal Sex is outputted which becomes "HIGH".

Then, the minimum sample value signal Se is inputted to the D type flip-flop 36. Moreover, the exclusive OR signal Sex is inputted to an enable terminal of the D type flip-flop 36. Then, the D type flip-flop 36 outputs the minimum sample value signal Se, which is inputted at a timing when the exclusive OR signal Sex becomes "HIGH", as the zero-cross sample value signal Ss to the averaging circuit 21, on the basis of the clock signal Sclk inputted as the timing signal.

Next, the adder 41 and the D type flip-flop 40 to which the clock signal Sclk is inputted as the timing signal constitute a closed loop in the averaging circuit 21 to which the zero-cross sample value signal Ss is inputted. An output signal from the adder 41 is outputted to the multiplier 42. The output signal is also outputted to the D type flip-flop 40, and is delayed by a time duration corresponding to one clock of the clock signal Sclk by the D type flip-flop 40, and is added to the zero-cross sample value signal Ss inputted to the adder 41 after one clock. In other words, the closed loop constituted by the adder 41 and the D type flip-flop 40 has a function of accumulating and adding the zero-cross sample value signal Ss inputted to the averaging circuit 21 for each clock.

The output signal from the adder 41 as the result of the accumulation and the addition is multiplied by a constant k (wherein k<<1) by the multiplier 42. That is, the averaging process for the digital signal is applied to the above mentioned output signal. Accordingly, the averaged signal St is generated and outputted to the subtraction circuit 20.

The above explained operations in the subtraction circuit 20, the averaging circuit 21 and the zero-cross detection circuit 22 are repeated with the one clock in the clock signal Sclk as a unit.

Next, the whole operation along a time axis of the digital high pass filter 7 is explained below with reference to FIG. 3. FIG. 3 shows an example in which a direct current level that is the average of the analog reproduction signal Sp is shifted to a high side (i.e., to a positive direction). Now, the digital reproduction signal Sq is a signal which is obtained by sampling the analog reproduction signal Sp on the basis of the clock signal Sclk. Thus, the level of the digital reproduction signal Sq is also shifted to a high side. Moreover, the zero-cross sample points indicated by the black points on the digital reproduction signal Sq in FIG. 3 (which correspond to the zero-cross points in the reproduction signal Spp) are also shifted to a high side. Furthermore, the level of the corrected digital reproduction signal Sr is initially shifted to a high side. FIG. 3 shows the operational waveform when this level of the corrected digital reproduction signal Sr is corrected in conjunction with the elapsed time.

That is, when a sample value indicated by a symbol q1 in the digital reproduction signal Sq is inputted to the digital high pass filter 7 at a time zero, the averaged signal St is at a zero level at the time zero. Thus, the sample value indicated by the symbol q1 is directly outputted as a sample value indicated by a symbol r1 in the corrected digital reproduction signal Sr.

Then, in the zero-cross detection circuit 22, a sample value indicated by the symbol r1 is outputted as a sample value indicated by a symbol s1 in the zero-cross sample value signal Ss, in accordance with the above mentioned operation. Since the output level of the D type flip-flop 40 is at the zero level at this time zero, the sample value indicated by the symbol s1 is directly passed through the adder 41 in the averaging circuit 21, is multiplied by the constant k by the multiplier 42, and becomes a sample value indicated by a symbol t1 in the averaged signal St. Then, the sample value indicated by the symbol t1 is outputted to the subtraction circuit 20, and is subtracted from a sample value indicated by a symbol q2 in the digital reproduction signal Sq at a timing of a next clock.

After that, it is a sample value indicated by a symbol r4 in the corrected digital reproduction signal Sr that is obtained as a sample value indicated by a symbol s4 in the zero-cross sample value signal Ss, next to the sample value indicated by the symbol s1. This sample value indicated by the symbol r4 is obtained by subtracting a sample value indicated by a symbol t3 in the averaged signal St from a sample value indicated by a symbol q4 in the digital reproduction signal Sq. Then, the adder 41 adds the sample value held in the D type flip-flop 40 to the sample value indicated by the symbol s4. Moreover, the multiplier 42 multiplies the added result by the constant k. Then, the multiplied result is outputted to the subtraction circuit 20 as a sample value indicated by the symbol t4 in the averaged signal St.

Next, it is a sample value indicated by a symbol r7 in the corrected digital reproduction signal Sr that is obtained as a sample value indicated by a symbol s7 in the zero-cross sample value signal Ss, next to the sample value indicated by the symbol s4. This sample value indicated by the symbol r7 is obtained by subtracting a sample value indicated by a symbol t6 in the averaged signal St from a sample value indicated by a symbol q7 in the digital reproduction signal Sq. Then, the adder 41 adds the sample value held in the D type flip-flop 40 to the sample value indicated by the symbol s7. Moreover, the multiplier 42 multiplies the added result by the constant k. Then, the multiplied result is outputted to the subtraction circuit 20 as a sample value indicated by a symbol t7 in the averaged signal St.

Figure 3:
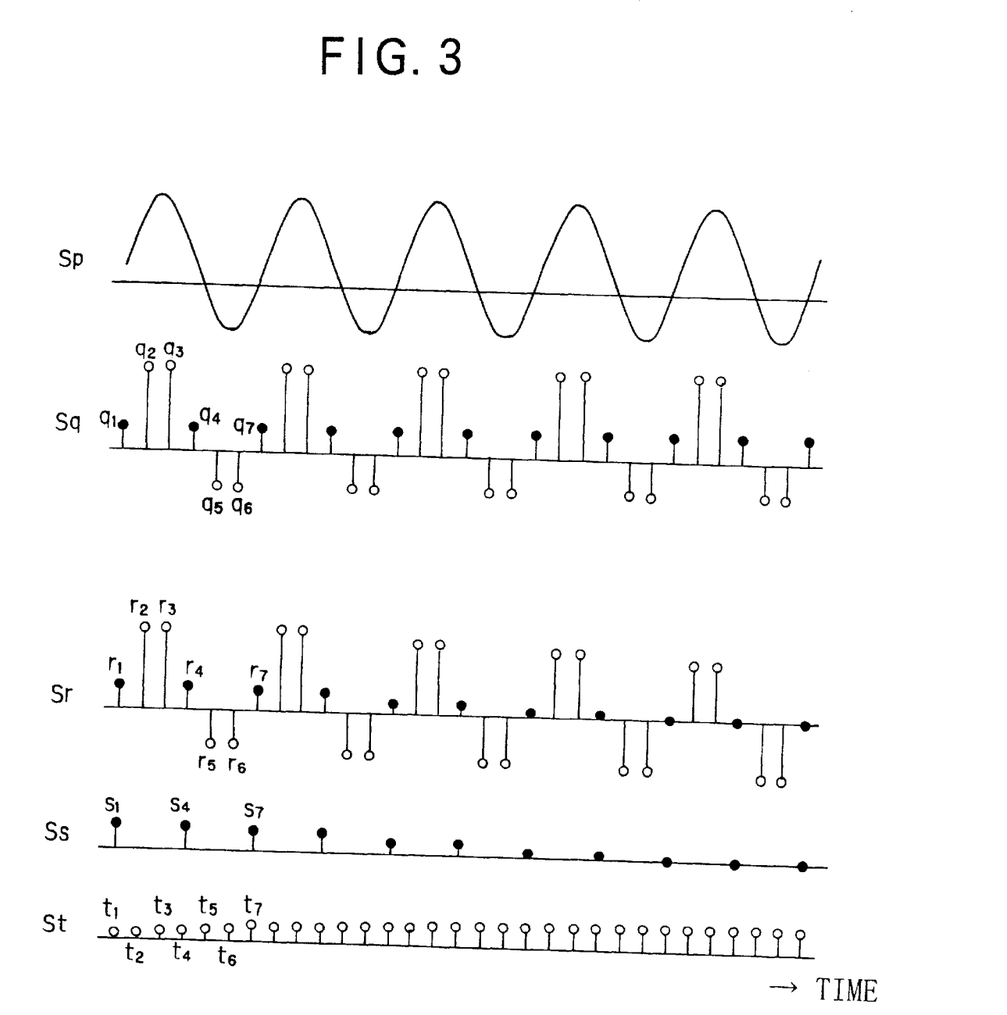
FIG. 3 is a timing chart showing an operation of the digital high pass filter of the embodiment.

As a result of the repetition of the above mentioned operations in the subtraction circuit 20, the averaging circuit 21 and the zero-cross detection circuit 22, the sample value of the averaged signal St is gradually increased, and then becomes constant, as shown in FIG. 3. Along with this, as for the sample value of the corrected digital reproduction signal Sr, the zero-cross sample value thereof coincides with the zero level, as shown in FIG. 3.

Accordingly, the zero-cross sample value which is shifted to the positive direction in the digital reproduction signal Sq shown in FIG. 3 is corrected so as to coincide with the zero level. This leads to the generation of the corrected digital reproduction signal Sr shown in FIG. 3.

Incidentally, the cut-off frequency of the digital high pass filter 7 is selected so as to be as high as possible, in order to effectively remove the external disturbance and the like and also speed up the recovery from a dropout and the like. Actually, for example, the cut-off frequency is set to 10 kilo-hertzes (kHz). Even if such a high frequency is defined as the cut-off frequency, the digital record information having the frequency component, which is higher than the cut-off frequency of the analog high pass filter 4 (in this embodiment, 1 kilo-hertz) and lower than the cut-off frequency of the digital high pass filter 7 (in this embodiment, 10 kilo-hertzes), is passed through the digital high pass filter 7 without attenuation and is decoded as the corrected digital reproduction signal Sr by the above mentioned operations of the respective elements in the digital high pass filter 7 (i.e., the operations to return the zero-cross sample value of the digital reproduction signal Sq back to the zero level).

The operation of the digital high pass filter 7 when the frequency of the clock signal Sclk is changed in response to the reproduction speed is explained below.

A transmission function G(z) of the averaging circuit 21 is expressed as following.

$$G(z)=k/(1-z^{-1})$$

Thus, a whole transmission function H(z) of the digital high pass filter 7 is expressed as following.

$$H(z)=1/(1+G(z))=(1-z^{-1})/(1-z^{-1}+k) \quad (1)$$

Hence, a frequency transmission function H($\omega$) of the digital high pass filter 7 can be determined by substituting $z=\exp(j\omega T)$ for the above equation (1), wherein $\omega$ represents an angular frequency, and T represents a cycle (period) of the clock signal Sclk. Namely, the frequency transmission function H($\omega$) can be determined as following.

$$H(\omega)=(1-\exp(-j\omega T))/(1-\exp(-j\omega T)+k)=(1-\cos\omega T+j\sin\omega T)/(1-\cos\omega T+j\sin\omega T+k)$$

On the other hand, assuming that a frequency is f and a sampling frequency of the clock signal Sclk is fs, since $\omega=2\pi f$ and T=1/fs, the frequency transmission function H(f) of the digital high pass filter 7 is expressed as following.

$$H(f)=(1-\cos(2\pi f/fs)+j\sin(2\pi f/fs))/(1-\cos(2\pi f/fs)+j\sin(2\pi f/fs)+k) \quad (2)$$

As can be seen from the equation (2), the frequency transmission property of the digital high pass filter 7 is a function of (f/fs). Thus, the frequency transmission property (in other words, the cut-off frequency of the digital high pass filter 7) is automatically optimized in accordance with the frequency fs of the clock signal Sclk.

The situation in which the frequency transmission property (cut-off frequency) of the digital high pass filter 7 is automatically optimized is actually explained with reference to FIG. 4. In FIG. 4, a right rising curve on a left side indicates a frequency transmission property when the frequency of the clock signal Sclk is 5 mega-hertzes (fs=5 MHz), and a right rising curve on a right side indicates a frequency transmission property when the frequency of the clock signal Sclk is 50 mega-hertzes (MHz).

Figure 4:
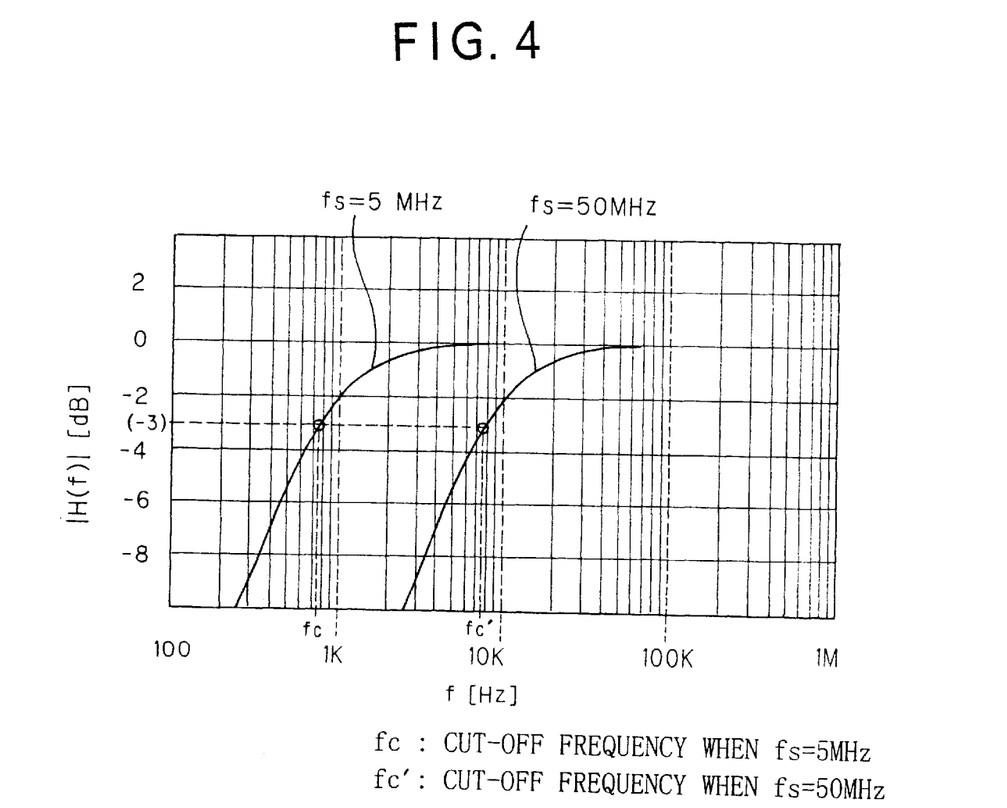
FIG. 4 is a chart view showing a relation of a transmission property versus frequency of the digital high pass filter of the embodiment.

As can be seen from FIG. 4, if the frequency of the clock signal Sclk becomes 10 times, the cut-off frequency becomes 10 times (as indicated by a white circle mark in FIG. 4) while a shape of a curve indicating the frequency transmission property of the digital high pass filter 7 maintains its original state. That is, if the frequency of the clock signal Sclk becomes n times (n is a natural number), the cut-off frequency automatically becomes n times. Moreover, the frequency transmission property becomes a frequency transmission property simply having the values identical to n times of the values on the frequency axis.

As explained above, according to the operations of the information reproducing apparatus S as the first embodiment, the digital reproduction signal Sq is corrected such that the zero-cross sample value in the corrected digital reproduction signal Sr coincides with the zero level. Thus, even if the low band component in the reproduction signal Spp is reduced, the reduced component can be restored.

Moreover, as for the noise resulting from the external disturbance and the like, it is possible to reduce a frequency component lower than the cut-off frequency of the digital high pass filter 7.

The configuration of the closed loop in the digital high pass filter 7 corrects the digital reproduction signal Sq to thereby enable the corrected digital reproduction signal Sr to be exactly generated and also enable the digital record information to be exactly reproduced.

Moreover, the cut-off frequency of the digital high pass filter 7 is set to high, for example, 10 kilo-hertzes. Hence, even if a signal drop, such as the dropout and the like, is contained in the reproduction signal Spp, the corrected digital reproduction signal Sr can be quickly recovered from the signal drop.

Moreover, the cut-off frequency of the digital high pass filter 7 is varied in response to the variation of the frequency of the clock signal Sclk. Thus, even if the frequency of the reproduction signal Spp is changed depending on the multiple-time speed reproduction or the variable speed reproduction, it is possible to effectively reduce the noise component of the low frequency in the digital high pass filter 7.

Moreover, the corrected digital reproduction signal Sr is decoded by using the VITERBI decoding method. Thus, even if an S/N ratio of the corrected digital reproduction signal Sr is low, it is possible to exactly carry out the decoding reproduction.

Incidentally, the above mentioned embodiment has the configuration in which the constant k is multiplied by using the multiplier 42 in the averaging circuit 21. Typically, this constant k is set as: k<<1. Now, if $k=½^n$ (n is a natural number) is set, the simpler configuration can generate the averaged signal St by bit-shifting the output signal of the adder 41 on the basis of the value n without using the multiplier 42.

(II) Second Embodiment

Figure 5:
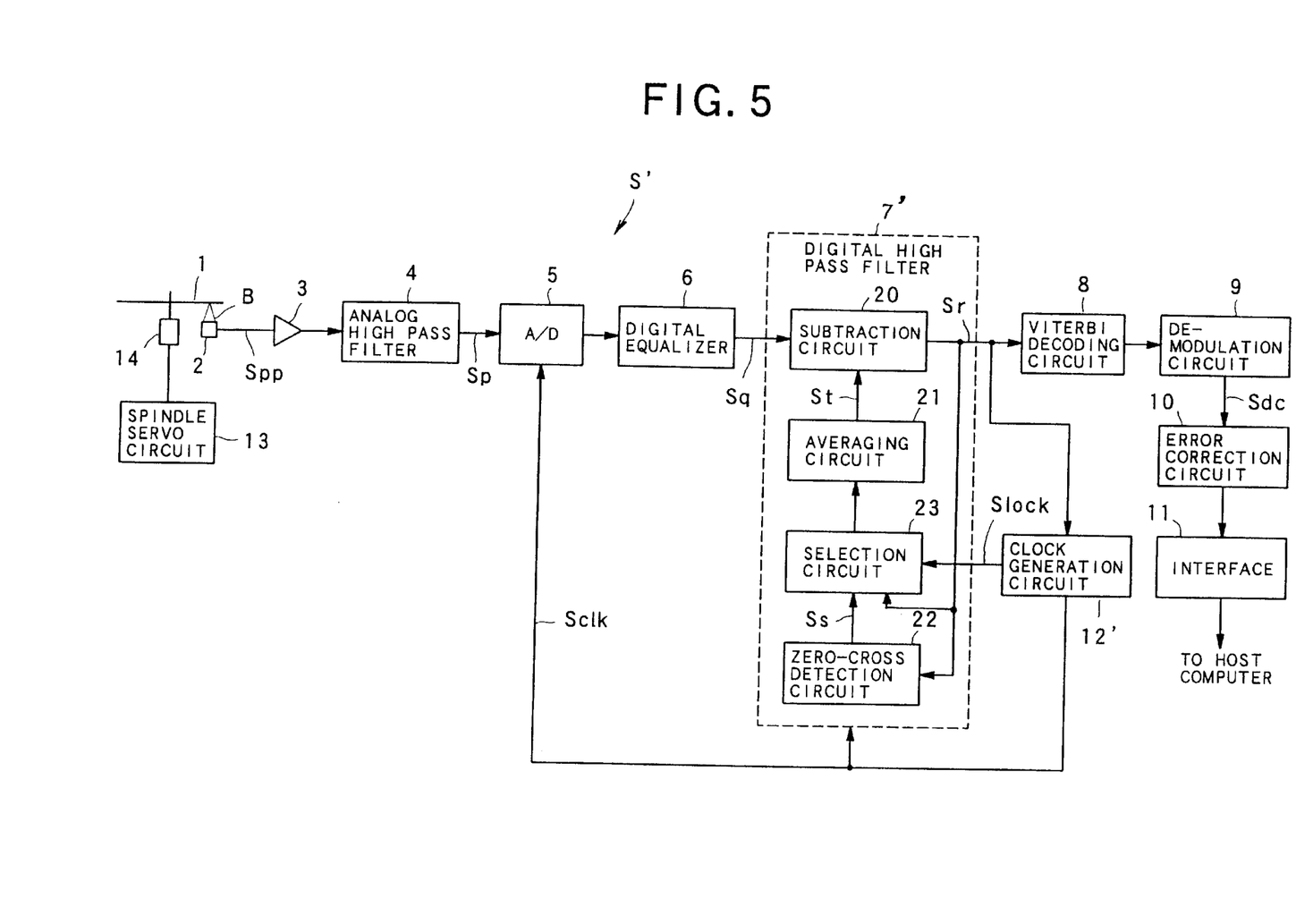
FIG. 5 is a block diagram showing a schematic configuration of an information reproducing apparatus in a second embodiment.

A second embodiment of the present invention will be explained with reference to FIG. 5. In FIG. 5, the same constitutional elements as those in FIG. 1 carry the same reference numerals, and the explanations thereof are omitted.

In the information reproducing apparatus S as the first embodiment, it is a premise that the phases of the analog reproduction signal Sp and the clock signal Sclk are synchronous with each other. However, the phases of the analog reproduction signal Sp and the clock signal Sclk are not necessarily synchronous with each other, in the actual reproduction of the digital record information. If the phases are not synchronous, the analog reproduction signal Sp cannot be exactly sampled for each cycle. This results in the inexact executions of the zero-cross detection and the like, and the function of the digital high pass filter 7 cannot be sufficiently carried out. Then, in the second embodiment, it is judged by a clock generation circuit whether or not the above mentioned phases are synchronous with each other. If they are not synchronous with each other, the digital high pass filter 7 is operated without the zero-cross detection.

That is, as shown in FIG. 5, an information reproducing apparatus S' as the second embodiment is provided with: instead of the clock generation circuit 12 in the configuration of the information reproducing apparatus S in the first embodiment, a clock generation circuit 12' which generates the clock signal Sclk on the basis of the corrected digital reproduction signal Sr similarly to the clock generation circuit 12, and also generates a lock signal Slock indicating whether or not the phases of the corrected digital reproduction signal Sr and the clock signal Sclk are synchronous with each other; and instead of the digital high pass filter 7, a digital high pass filter 7' having a selection circuit 23 servicing as one example of a selecting device which outputs the corrected digital reproduction signal Sr directly to the averaging circuit 21, when the phases of the corrected digital reproduction signal Sr and the clock signal Sclk are not synchronous with each other, on the basis of the lock signal Slock, and also outputs to the averaging circuit 21 the zero-cross sample value signal Ss as the zero-cross sample value from the zero-cross detection circuit 22 when the phases of the corrected digital reproduction signal Sr and the clock signal Sclk are synchronous with each other, on the basis of the lock signal Slock. Other configurations of the information reproducing apparatus S' are the same as those of the information reproducing apparatus S in the first embodiment. Thus, the detailed explanations are omitted.

In the information reproducing apparatus S' as the second embodiment, when the phases of the corrected digital reproduction signal Sr and the clock signal Sclk are not synchronous with each other, that is, when the phases of the analog reproduction signal Sp and the clock signal Sclk are not synchronous with each other, all sample values contained in the corrected digital reproduction signal Sr are averaged, and this average level is outputted to the subtraction circuit 20 as the averaged signal St, by the operation of the selection circuit 23. By this operation, the average level of the corrected digital reproduction signal Sr is made coincident to the zero level. After all, the zero-cross sample value of the corrected digital reproduction signal Sr schematically coincides with the zero level.

On the other hand, when the phases of the corrected digital reproduction signal Sr and the clock signal Sclk are synchronous with each other, that is, when the analog reproduction signal Sp and the clock signal Sclk are synchronous with each other, the operation is performed in the same manner as that of the information reproducing apparatus S as the first embodiment. Hence, the corrected digital reproduction signal Sr is exactly outputted by the digital high pass filter 7'.

According to the above mentioned operation of the information reproducing apparatus S' as the second embodiment, in addition to the effect of the information reproducing apparatus S as the first embodiment, the respective sample values of the corrected digital reproduction signal Sr are selected and averaged when the analog reproduction signal Sp and the clock signal Sclk are not synchronous with each other. Alternatively, the operation similar to the first embodiment is carried out when the analog reproduction signal Sp and the clock signal Sclk are synchronous with each other. Thus, it is possible to protect the erroneous operation when the analog reproduction signal Sp and the clock signal Sclk are not synchronous with each other, and resume the exact filter process immediately after the synchronization is recovered.

(III) Modifications

Various modifications other than the above mentioned embodiments are possible according to the present invention.

That is, for example, although the averaging circuit 21 in the first or second embodiment has the configuration of accumulating and adding the respective sample values within the zero-cross sample value signal Ss or the corrected digital reproduction signal Sr, it may be adapted so as to accumulate and add only values indicative of the polarity of the respective sample values, i.e., "+1" or "−1" and then multiply the accumulated and added value by the constant k to thereby generate the averaged signal St. In this case, as a result, it is judged only whether the corrected digital reproduction signal Sr is shifted to the positive direction or the negative direction, to perform the correction on the basis of this judgment result. Hence, the averaging circuit 21 can have the configuration in which the number of the bits of the adder 41 and the D type flip-flop 40 is reduced.

The zero-cross detection circuit 22 may zero-clear the zero-cross sample value signal Ss outputted therefrom, when the polarity of the corrected digital reproduction signal Sr is not inverted within a predetermined time duration. This is intended to, for example, prevent the error from being accumulated, because the zero-cross sample value signal Ss keeps the previous value, when it takes a long time to invert the polarity because of the occurrence of the dropout.

Moreover, from the same reason, it may be implemented so as to output the zero-cross sample value signal Ss only for one cycle of the clock signal Sclk if the polarity of the corrected digital reproduction signal Sr is inverted, and zero-clear the zero-cross sample value signal Ss in the other time duration.

Moreover, the above mentioned error accumulation may be prevented by installing a limiter at an output end of the adder 41.

Figure 2:
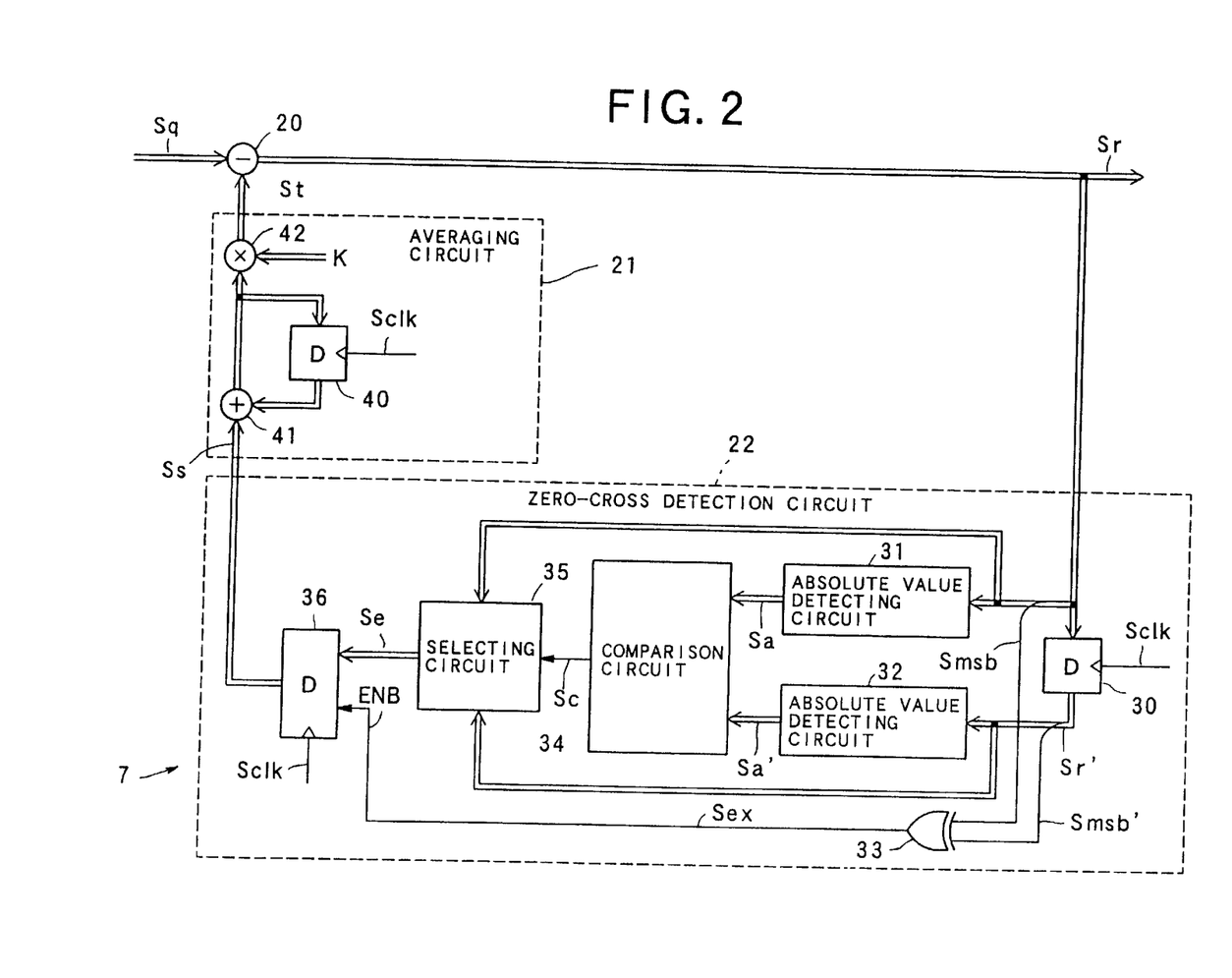
FIG. 2 is a block diagram showing a detailed configuration of a digital high pass filter of the embodiment.

Moreover, it may be implemented to output the exclusive OR signal Sex in FIG. 2 to the D type flip-flop 40 in FIG. 2 to then execute the accumulation and the addition of the zero-cross sample value signal Ss only when the polarity of the corrected digital reproduction signal Sr is inverted.

Furthermore, in the above mentioned embodiments and modifications, the closed loop within the digital high pass filter 7 or 7' is used to feed back the corrected digital reproduction signal Sr to thereby correct the direct current level of the digital reproduction signal Sq. Instead, it may be implemented to input the digital reproduction signal Sq directly to the zero-cross detection circuit 22 and thereby extract the zero-cross sample value in the digital reproduction signal Sq and then subtract this value from each sample value of the original digital reproduction signal Sq directly (without averaging). Such a configuration can restore the low frequency component of the information lost in the digital reproduction signal Sq to exactly reproduce the digital record information on the DVD 1.

As explained above in detail, according to the present embodiments, even if the low band component in the reproduction signal is reduced, the reduced component can be restored. Therefore, it is possible to reproduce the digital record information exactly and accurately while maintaining the signal component in the low frequency region.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-241497 filed on Sep. $5^{th}$, 1997 including the specification, claims, drawings and summary is incorporated herein by reference in its entirety.

What is claimed is:

1. An information reproducing apparatus for reproducing digital record information recorded on an information record medium, comprising:
    a generating device for reading out the digital record information from said information record medium to thereby output a reproduction signal;
    a sampling device for sampling the reproduction signal by using a sampling clock signal having a predetermined sampling frequency to thereby output the sampled reproduction signal;
    a correcting device for correcting the sampled reproduction signal so as to make a zero-cross sample value, which is a sample value contained in the corrected sampled reproduction signal and is the closest sample value to a zero level in the corrected sampled reproduction signal, coincident with the zero level to thereby output the corrected sampled reproduction signal; and
    a reproducing device for decoding the corrected sampled reproduction signal to thereby reproduce the digital record information,
    wherein said correcting device comprises:
        an extracting device for extracting a smaller absolute value of two consecutive sample values when polarities of the two consecutive sample values contained in the corrected sampled reproduction signal are different from each other, as the zero-cross sample value;
        an averaging device for averaging the extracted zero-cross sample value over a plurality of cycles of the sampled reproduction signal to thereby output an average thereof; and
        a subtracting device for subtracting the outputted average from each sample value of the sampled reproduction signal to thereby output the corrected sampled reproduction signal.

2. An information reproducing apparatus according to claim 1, wherein
    said correcting device further comprises a selecting device for selecting either one of (i) each sample value in the corrected sampled reproduction signal and (ii) the zero-cross sample value over the plurality of cycles, and
    said averaging device averages the selected sample value to thereby output the average.

3. An information reproducing apparatus according to claim 2, wherein said selecting device selects (i) said each sample value when the sampling clock signal and the reproduction signal are not synchronous with each other and selects (ii) said zero-cross sample when the sampling clock signal and the reproduction signal are synchronous with each other.

4. An information reproducing apparatus according to claim 1, wherein
    said sampling device comprises an A/D (Analog to Digital) converter, and
    said apparatus further comprises an analog filter disposed between said generating device and said A/D converter for reducing a frequency component of the reproduction signal lower than a predetermined analog cut-off frequency.

5. An information reproducing apparatus according to claim 1, wherein said reproducing device is a reproducing device using a VITERBI decoding means.

6. An information reproducing apparatus for reproducing digital record information recorded on an information record medium, comprising:
    a generating device for reading out the digital record information from said information record medium to thereby output a reproduction signal;
    a sampling device for sampling the reproduction signal by using a sampling clock signal having a predetermined sampling frequency to thereby output the sampled reproduction signal;
    a correcting device for reducing a low frequency component lower than a predetermined digital cut-off frequency, which is changed in response to the predetermined sampling frequency from the sampled reproduction signal, to thereby output the corrected sampled reproduction signal; and
    a reproducing device for decoding the corrected sampled reproduction signal to thereby reproduce the digital record information.

7. An information reproducing apparatus according to claim 6, wherein the digital cut-off frequency is changed according to the reproduction speed of multiple speed reproduction.

8. An information reproducing apparatus according to claim 6, wherein the digital cut-off frequency is changed according to the reproduction speed of variable speed reproduction.

* * * * *